May 28, 1968 W. KNOPFLE 3,385,603

RESETTING MECHANISM FOR PHONOGRAPH TURNTABLES

Filed July 2, 1965 2 Sheets-Sheet 1

Inventor:

Walter Knöpfle

By Fisher, Christen, Sabol & Caldwell

Attorneys

May 28, 1968 W. KNOPFLE 3,385,603

RESETTING MECHANISM FOR PHONOGRAPH TURNTABLES

Filed July 2, 1965 2 Sheets-Sheet 2

Inventor:

Walter Knöpfle

By Fisher, Christen, Sabol & Caldwell attorneys

United States Patent Office 3,385,603

Patented May 28, 1968

3,385,603

RESETTING MECHANISM FOR PHONOGRAPH TURNTABLES

Walter Knopfle, St. Georgen, Black Forest, Germany, assignor to Firma Perpetuum-Ebner, Fabrik fur Feinmechanik und Elektrotechnik Steidinger & Co., Komm. Ges., St. Georgen, Black Forest, Germany Filed July 2, 1965, Ser. No. 469,063

Claims priority, application Germany, July 11, 1964, P 34,675

6 Claims. (Cl. 274—15)

ABSTRACT OF THE DISCLOSURE

A two element resetting mechanism for an automatic disk record player, one element being driven frictionally by the other element for initiating return of the tone arm at the end of a playing cycle, with resilient biasing means to return the deflection mechanism to its original position.

The invention relates to means for automatically resetting the shut-off of a phonograph record player without having to move the tone arm horizontally.

In known record players or turntable units, the shut-off works on the deflection principle, being provided with a deflection lever, and is operated when the stylus of the pickup cartridge travels in the center run-out grooves of the phonograph record. In order to return the shut-off to its initial position—that is, in order to reset it—for the purpose of replaying the record, the pickup arm, with known record players, must be pivoted all the way outwardly. This operation of moving the arm is complicated and troublesome and particularly disadvantageous when the playing of a record is stopped in the middle or in a definite groove, as in a studio, and considerably later the playing is to be resumed in precisely the same groove. Because at sometime between the stopping and the resumption of the playing of the record the arm must be horizontally pivoted, it is nearly, or utterly, impossible to place the stylus of the pickup cartridge in exactly the same groove. Resetting the shut-off by pivoting the arm is particularly irksome in record players possessing a mechanism for automatically raising and lowering the pickup arm, because the arm cannot be automatically raised and later the stylus set in the same groove.

To find a given spot in a particular groove of a phonograph record, it is known, when reproducing the spoken word, to employ a marking arrangement on another record, which arrangement is operated by hand when the desired spot is reproduced and which resets the stylus on the exact spot after one further revolution of the record. Such an arrangement, which is particularly intended for broadcast studios, is not suitable for the self-actuating return of a deflection shut-off, such as found in most commercial apparatus.

It has also been suggested to provide a shut-off, operated by the raising of the pickup arm, on the edge of the record player. The bearing force of the pickup arm for opening a shutoff contact is amplified by small built-in magnets. However, in this instance, also, the arm must be swung out, so that it is not possible simply to reset the stylus in a particular groove.

An object of the invention is an arrangement that resets the shutoff without first requiring that the pickup arm be swung outwardly.

A further object of the invention is a shutoff reset arrangement that operates independently of any outward horizontal movement of the arm.

Another object of the invention is a shutoff reset arrangement that is operated during the raising of the pickup arm.

A still further object of the invention is a shutoff reset arrangement that is operable for any horizontal position of the arm.

Another object of the invention is a reset that may have either a mechanical or a magnetic form.

A further object of the invention is a reset suitable for record players or turntables in which the pickup arm is either manually or automatically placed on, and removed from, the phonograph record.

These and other objects of the invention will be apparent from the following detailed description, and from the drawings, wherein.

Figure 1:
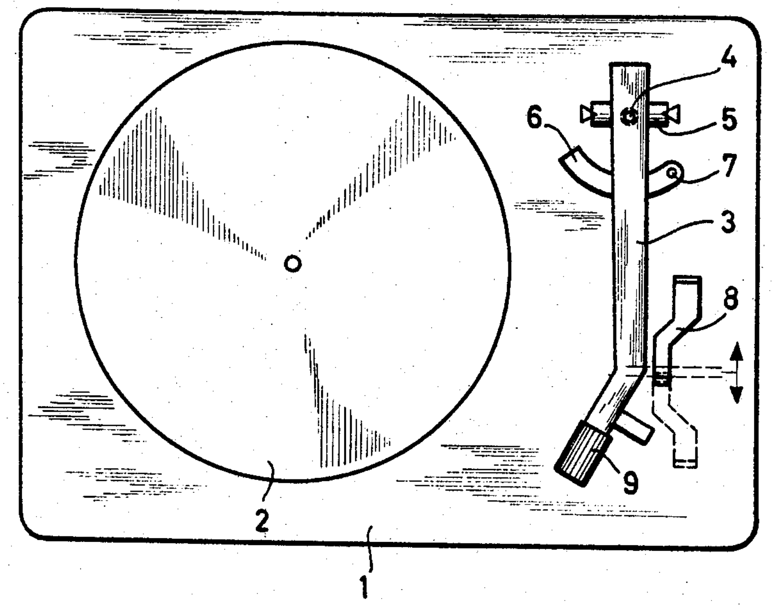
FIGURES 1 and 2 are top and side views of a turntable.

The record player shown at FIGURE 1 includes a mounting board or plate 1 having a turntable proper or platter 2 and a transducer, pickup or tone arm 3, which latter pivots horizontally about a mounting 4 and vertically about a mounting 5. In the figure the pickup arm is shown at rest in an elevated position, supported by the lowering and raising support 6, which is vertically adjustable in mounting or bearing 7. The height of the support is determined by the position of the rotatably mounted control lever 8. When the latter is in its forward position, shown in dashed line in the figure, the support is lowered, until the stylus of the transducer or pickup cartridge 9 engages the phonograph record 13 lying on the turntable. The arm is thus freed of the support 6. When the lever is in its rear end position, as shown in solid line in the figure, the support 6 is raised, so that the arm 3 and the stylus of the cartridge 9 are raised and supported above the surface of the record 13.

Figure 2:
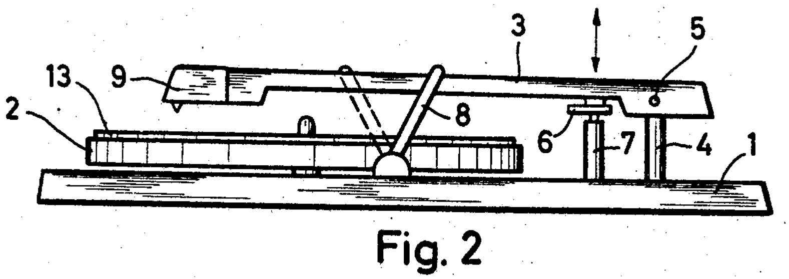

FIGURE 2 is a side view of the record player, showing the arm 3 raised above the record 13 by means of the support 6.

Figure 3:
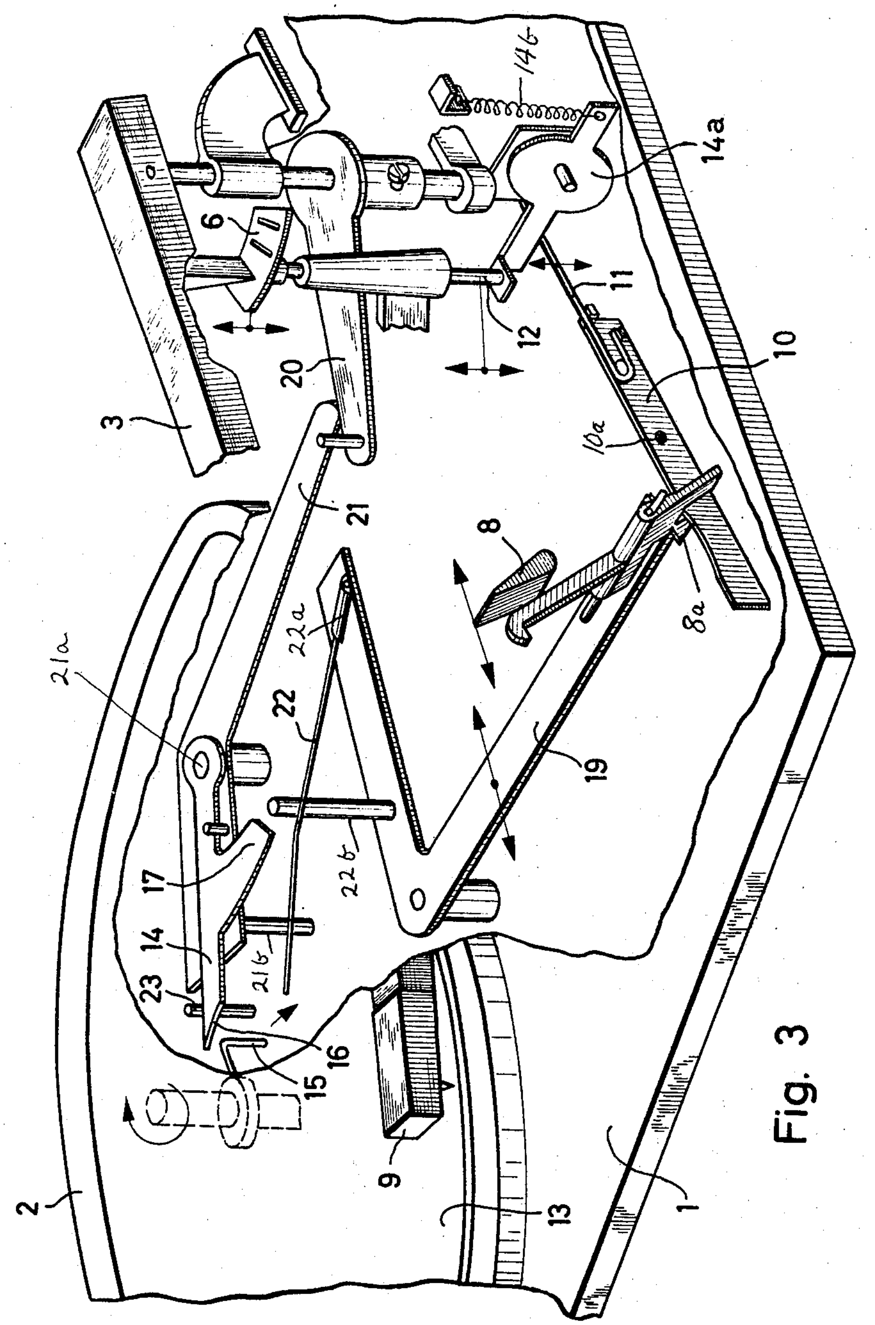
FIGURE 3 is a partially cut away view through the mounting board of the mechanism of the invention.

FIGURE 3 illustrates the mode of operation of the lowering mechanism and the shutoff switch in a first embodiment of the invention. Located below the mounting plate or board 1 is a rotatably mounted control rod 10 that operates the lowering mechanism 12 through a spring 11 and raises or lowers the support 6.

The rod 10 pivots about point 10*a* in a plane perpendicular to the mounting board 1, thereby raising and lowering the position of spring 11 mounted on one end of the rod 10.

By bringing the lever 8, which terminates at its lower end in a fork 8*a* that rides on the rod 10, to its rear end position, the rod 10 is pivoted counterclockwise, raising the spring 11 and thus the support 6. When the lever 8 is brought to its forward position, as shown in FIGURE 3 and in dashed line in FIGURE 2, the rod 10 is pivoted clockwise and the spring 11 lowered. The support 6, through the operation of the lowering mechanism 12, is thereby permitted to drop. The support is permitted to descend slowly through the agency of two friction disks or plates 14*a* that are under the tension of a spiral spring 14*b* and which control the fall of 12. As will be presently more fully explained, during the shutoff cycle, the control rod 10 and spring 11 are raised by an angle lever 19 through operation of a deflecting lever 14. The lever 19 is connected to the lever 8 by means of an articulation, such as a fork, for example, not shown. Thus, the support 6 is raised by means of the mechanism 12. The control lever 8 thereby is brought simultaneously to its correct position. From the foregoing, it is apparent that movement of lever 8 causes rod 10 and lever 19 to pivot. Conversely, when lever 19 is caused to pivot, as will be explained, rod 10 and lever 8 pivot.

The shut-off cycle, in accordance with the deflection principle, is accomplished by a deflection cam 15, rotating with the turntable 2, engaging the deflection lever 14. As the arm 3 pivots, a lever 20 that is rigid with the arm begins to move, at a predetermined angular position of the arm, a friction lever 21 and thereby the deflecting lever 14. The two levers 14 and 21, which frictionally engages one another, are mounted for independent rotation about a pivot point 21*a*.

Over the range that lever 20 pushes on lever 21, so long as the advance of the pickup arm 3 is slow, the deflecting lever 14, because the rotating cam 15 slides along the surface 16 of the lever 14, is always pushed back and thus prevented from following the rotation of lever 21 about the pivot point 21*a*. But when the advance of the arm becomes greater because the stylus is now travelling in the center run-out grooves which have a greater pitch, the lever 14 is moved into the path of cam 15, which strikes the deflection lever causing it to pivot about 21*a* in the direction of the angle lever 19. Because of this movement of lever 14, the arm 17, of the lever, pushes upon the angle lever 19, the rotation of which rotates the control rod 10 of the lowering mechanism 12 that the spring 11 is raised and the arm 3 is raised by means of the lowering support 6. The arm 8 is returned to its rear position, shown in solid line in FIGURES 1 and 2. Simultaneously with the pivoting of the angle, lever 19, a wire spring 22, secured to the lever at 22*a* and held under tension by a pin 22*b* rigid with lever 19, presses against a pin 21*b* rigidly connected to the underside of lever 21. The pretension in the spring forces back the levers 14 and 21, which move together because of their frictional engagement. The deflection lever 14 is returned to its original position against the stop 23, out of the path of the cam 15. The lever 21 is also returned to its home position. In its return movement it will be apparent that the friction lever presses upon lever 20, causing the latter, and therefore the tone arm 3, to pivot. However, since arm 20 contacts lever 21 only after the tone arm, during the playing of a record, has traversed a considerable arc, the pivoting of arm 20 and tone arm 3 is very small during the return movement of lever 21. The deflection lever 14 and the friction lever 21 thus are reset and again have full use of their paths of operation when the support 6 and thus the arm 3 are once again lowered.

The arrangement in accordance with the invention permits, with record players having a deflection shut-off, the unhindered playing of several selections of a record side in any desired sequence, as well the unhindered repeated resetting of the pickup arm 3 on the phonograph record, by means of the shut-off. The invention avoids a fundamental practical defect of the known shut-off schemes, while permitting the design of a record player that is foolproof to operate.

With the invention a record side can be replayed, portions of a side can be played, or a few grooves immediately repeated without having the shut-off interfere. More particularly, the pickup arm can be raised from the record and later reset in precisely the same groove, without having to swing the arm outwardly; which is particularly advantageous with turntables having automatic raising and lowering devices.

Although only mechanical embodiments of the deflection reset have been illustrated, it will be understood that, in accordance with the invention, the reset can also be operated by magnetic means.

Other modifications and improvements will be made by those skilled in the art which would come within the scope of the annexed claims.

I claim:

1. In an arrangement for a phonograph record player shut-off operating on the deflection principle, the combination including, a first lever; a deflection lever in frictional engagement with said first lever, said first and deflection levers comprising the shut-off; a pivot pin for mounting said first and deflection levers for independent rotation; first means operated by the arcuate movement of the tone arm of the record player as it tracks the grooves of a record for causing said first lever to pivot from its home position after the tone arm has been swept through a predetermined arc during the playing of a record; second means rotating with the platter of the turntable; a curved surface associated with said deflection lever and engaged by said second means during rotation thereof so long as the tone arm tracks the recorded portion of the phonograph record, whereby the deflection lever is prevented from moving from its home position and following said first lever; but when the tone arm tracks the center run-out grooves; the deflection lever is moved into the path of said second means, whereby said deflection lever is struck by said second means and pivoted in the same direction that said first lever is being pivoted; and resetting means including resilient biasing means for returning said first and deflection levers to their home positions during the vertical upward movement of the tone arm being raised from the face of the phonograph record.

2. The invention as defined in claim 1, wherein said resetting means includes an inclined surface that presses upon said first lever when the tone arm is manually lifted from the record and rotates said first and deflection levers back to their home position.

3. The invention as defined in claim 1, including means in cooperation therewith for automatically raising and lowering the tone arm, a second lever and pivot means therefor, said second lever being mounted for rotation between a first position in which the tone arm is raised and a second position in which the tone arm is lowered, and wherein said second position of said second lever is located to be struck by said deflection lever when the latter is struck by said second means, whereby the second lever is rotated to said first position causing said means for automatically raising and lowering the tone arm to raise the tone arm; said resilient means being on said first lever and so located thereon that the deflection lever, after being deflected, is returned to its home position by the pretension in the biased resilient means when said first lever is rotated to its first position.

4. The invention as defined in claim 2, including a vertical pin associated with the rear end of the tone arm; a rocker arm and pivot means therefor intermediate its ends, one end of said rocker arm being borne on by said pin when the tone arm is lifted from the face of the phonograph record and the other end carrying said inclined surface.

5. In combination with a shut-off for a phonograph record player, said shut-off operating on the deflection principle, and including a deflection lever and a cam for deflecting the lever from its home position, and being actuated by the accelerated movement of the tone arm when the latter tracks the center run-out grooves of a phonograph record, a reset means for resetting the shut-off: first means for automatically raising and lowering the tone arm; a first lever and a pivot means therefor, said lever being mounted for rotation between a first position in which the tone arm is raised and a second position in which the tone arm is lowered, and when in said second position being located to be struck by the deflection lever when the latter is deflected by the cam, whereby said first lever is rotated to said first position causing said first means to raise the tone arm; a stressed resilient means on said first lever and so located that the deflection lever, after being deflected, is returned to its home position by the pretension in the stressed resilient means when the first lever is being rotated to its first position and the tone arm is being raised.

6. The combination of claim 5, including a friction lever in frictional engagement with said deflection lever; means associated with the tone arm for pivoting the friction lever from its home position independent of said deflection lever during a portion of the arcuate movement of the tone arm while playing a record; said friction lever being returned to its home position when said deflection lever is returned to its home position.

References Cited

UNITED STATES PATENTS 3,049,354 8/1962 Guest ---------------- 274—1

LEONARD FORMAN, *Primary Examiner.*

F. J. D'AMBROSIO, *Assistant Examiner.*